ELECTRONIC COMMUTATOR

INVENTOR
Edwin A. Goldberg
BY Harry Tunick
ATTORNEY

Aug. 7, 1951 E. A. GOLDBERG 2,563,406

ELECTRONIC COMMUTATOR

Filed Oct. 8, 1949 2 Sheets-Sheet 2

INVENTOR
Edwin A. Goldberg
BY Harry Tunick
ATTORNEY

Patented Aug. 7, 1951

2,563,406

UNITED STATES PATENT OFFICE 2,563,406

ELECTRONIC COMMUTATOR

Edwin A. Goldberg, Princeton Junction, N. J., assignor to Radio Corporation of America, a corporation of Delaware Application October 8, 1949, Serial No. 120,403

10 Claims. (Cl. 332—40)

Figure 1A:
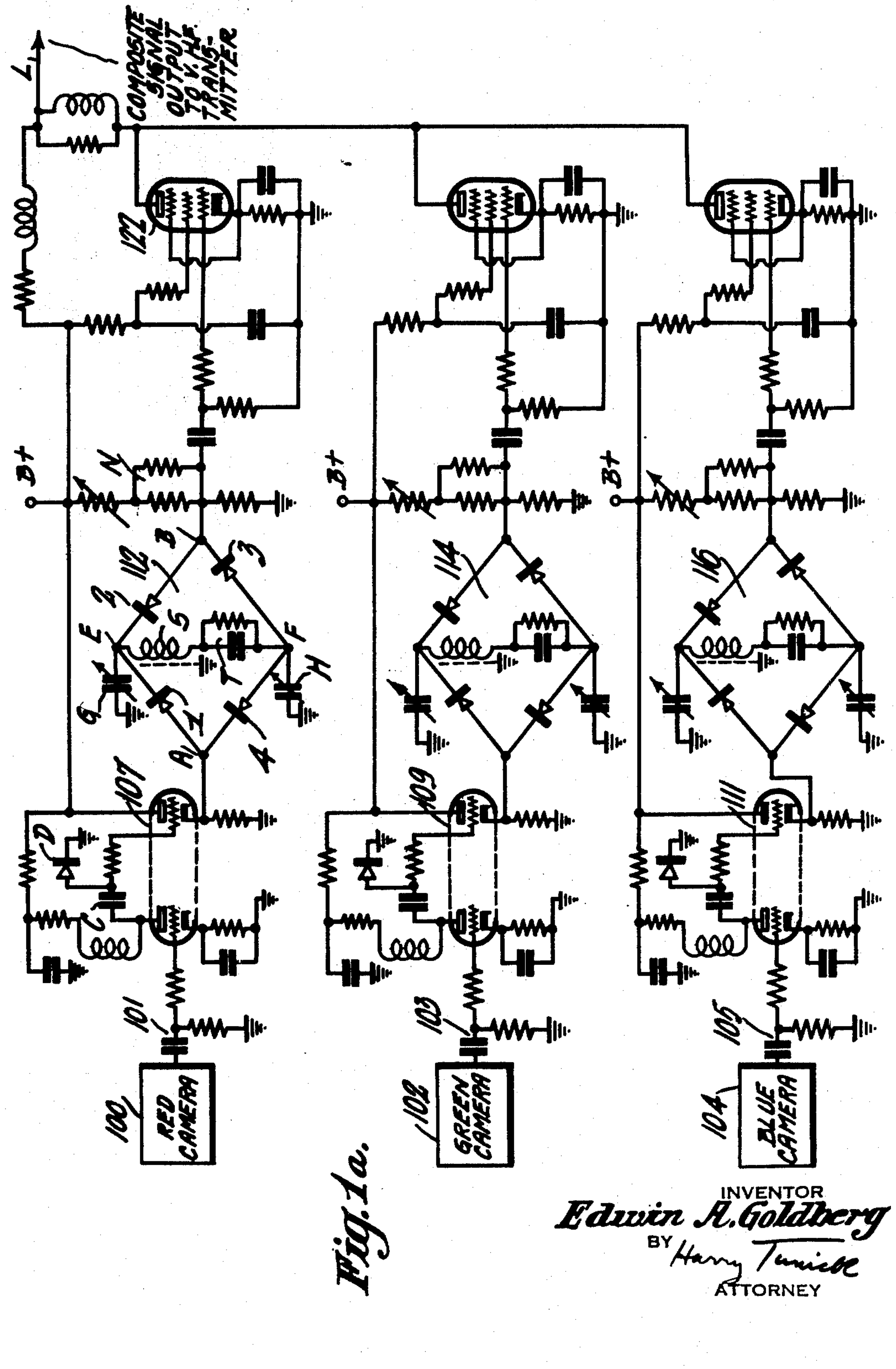

This invention relates broadly to an improved electronic commutator suitable for use, by way of example, in a time division multiplex system in which a common transmission medium or single channel is sequentially assigned at the terminal equipment to several branch circuits or sub-channels.

The commutator of the invention is herein described with particular reference to a color television system, though not limited thereto, wherein the apparatus of the invention samples color information from a plurality of individual color channels. The individual color channels are located at the terminal equipment and may be considered branch circuits or sub-channels. More specifically, in such a color television system, bits of video information at the transmitter emanating from three color channels, such as green, red and blue, each fed by the output of a separate color camera, are sequentially fed into a common output circuit. Each color camera is responsive to a different one of three additively primary color components of the color image to be transmitted. The output of the commutator comprises a series of pulses divisible into groups of three, the amplitude variations of each pulse or of a given group corresponding to the light intensity variations of the color component it represents. At the receiver, a similar electronic commutator operating in synchronism with the transmitter commutator, applies the demodulated pulses to the three receiving color channels in substantially the same manner as the transmitter commutator operates. Each receiving color channel, in accordance with one particular color television system presently known, includes a kinescope. The images on the three kinescopes are given suitable color hues by the use of suitable phosphors or by filters corresponding to the three colors of the transmitter color channels. The monochrome color records thus produced are then optically combined with one another to form a complete television color image.

The electronic commutator of the invention, in effect, connects the common interconnecting transmission medium with one color channel after the other in rapid succession. At the transmitter, the pulse outputs from the different color channels are time displaced successively by 120 degrees of the sampling frequency, thereby producing a composite signal in a common output circuit. At the receiver, the demodulated video wave is sampled by a similar electronic commutator at 120 degree time intervals and the time displaced samples are fed into the different color channels. The time displacement of the pulses from the three color channels to the transmitter commutator, or from the common inter-connecting network to the three receiver color channels may be made to be non-overlapping, albeit contiguous, or if desired, to overlap to a desired degree. This can be achieved by shifting the relative phases of the three control waves produced in the commutator which, in turn, are derived from a common high frequency sampling source, and by varying the time width of the samples.

Briefly, the commutator of the invention comprises a sine wave sampling oscillator input from which is derived three different control waves of sine wave character having suitable phase displacements. It is preferred that these phase displacements be 120 degrees relative to one another. The commutator includes three varistor networks, in the form of germanium rectifier bridges, each bridge of which is controlled to be conductive at a particular interval from a different control wave. The three varistors are assigned to the three different color channels at the transmitter. The varistors are respectively driven or fed by different color cameras, and the output from all three varistors are combined to feed the common output circuit. At the receiver, the three varistors are fed or driven by the demodulated video composite wave appearing in the common input circuit, while the outputs of the varistors separately feed different color channels.

Figure 1B:
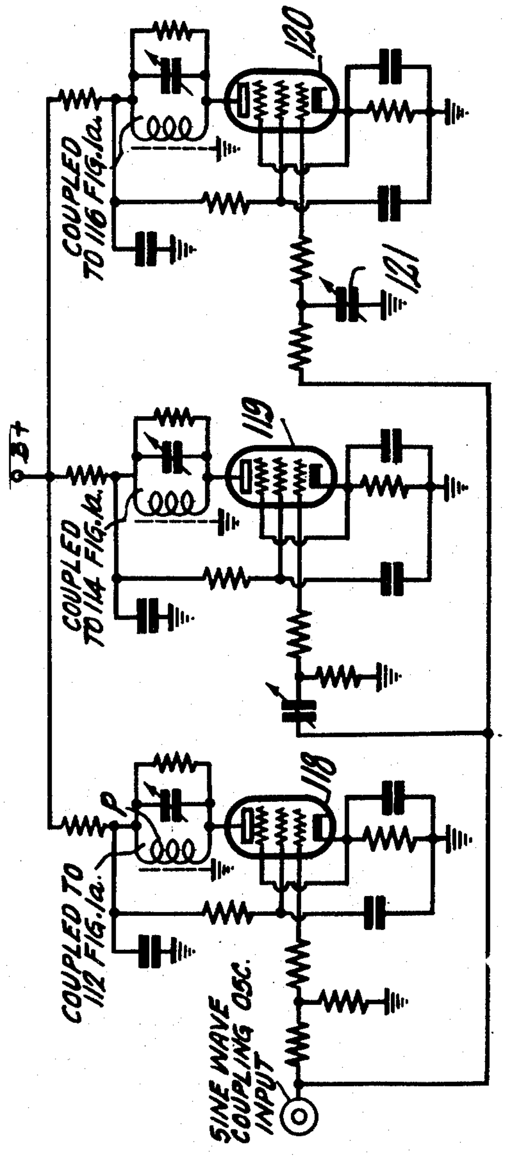
Figure 3:
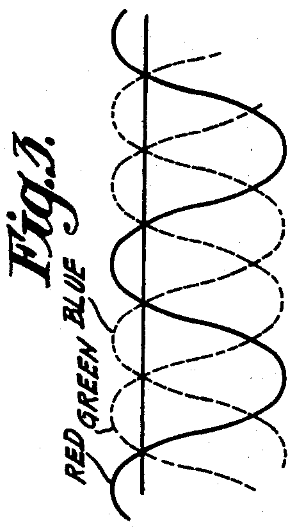
Figure 2:
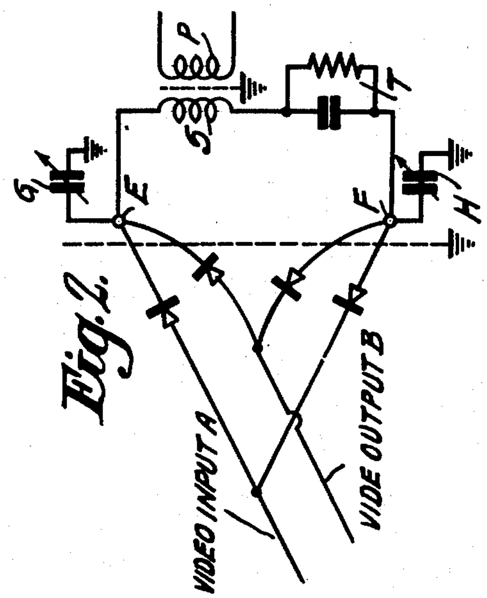

A more complete description of the invention follows in conjunction with a drawing wherein Figs. 1*a* and 1*b* taken together illustrate the invention used as a commutator in the transmitter of a three-channel color television system;

Fig. 2 shows in more detail the manner in which the input and output terminals of each varistor of the commutator are shielded from the control wave; and Fig. 3 graphically represents the mutually exclusive conduction periods of the three different varistors of the electronic commutator of the invention for passing the video modulations of the three different color channels.

Referring to Figs. 1*a* and 1*b* in more detail, there is shown a single channel color television transmitter for transmitting signals representing three primary colors, such as red, green, and blue. Three color television cameras 100, 102 and 104 responsive respectively to red, green and blue color components of the color image to be transmitted, are focused on the image being televised. The cameras are in different color channels, and each camera may comprise an iconoscope tube or an image orthicon, by way of example. Such an orthicon type tube is illustrated in U. S. Patent 2,377,972 issued June 12, 1945, to Otto Schade. In front of each camera is a suitable colored optical filter, not shown, so that the video signals corresponding to the intensity of only one component color are developed by each camera. The video modulation outputs from the three color cameras are fed over leads 101, 103 and 105 respectively, to the two-stage class A amplifiers 107, 109 and 111, as shown. The first stage of each amplifier, 107, 109, or 111, is a conventional class A amplifier, while the second stage is connected as a cathode follower. The D. C. level corresponding to the no-modulation output or black level is restored in each channel by a combination of condenser C and rectifier D. Since this arrangement so far described, forms no part of the present invention and is well understood by those skilled in the art, it is not believed necessary to explain the operation thereof in more detail.

The electronic commutator of the invention to which all three color channels are connected comprises three varistors 112, 114 and 116, each of which, in effect, is a balanced modulator arrangement and comprises four rectifiers arranged in a bridge circuit, as shown, and fed with a control wave emanating from a common sine wave sampling oscillator input. Since all three varistors are constructed similarly and operate similarly, it is believed that a description of only one of them will be sufficient for an understanding of the operation of all three varistors. Taking varistor 112, for example, this circuit is a bridge which has four rectifiers (such as germanium rectifiers) 1, 2, 3, and 4 in the different arms of the bridge. The bridge is fed with video information from the respective color channel over terminal A, while the output from the bridge is taken from terminal B. Terminals A and B appear at diagonally opposite corners of the bridge. Across the other diagonally opposite corners of the bridge; viz, E and F, there is connected a series circuit comprising a secondary winding S of a transformer and a resistor-shunt condenser combination T. Also connected to the terminals E and F are variable balancing capacitors G and H which are connected between these terminals and ground. Ground may be any suitable point of reference potential.

The secondary winding S is fed by a control wave of sine waveform from the primary winding P of one of the three amplifiers 118, 119 or 120 shown in Fig. 1*b*. These amplifiers may, if desired, be class A amplifiers and are driven from the common sine wave sampling oscillator. In effect, amplifiers 118, 119 and 120 comprise phase shifters for supplying the different varistors with sine waves at 120 degree phase relationship relative to one another. This is achieved by supplying the grid of the amplifier 118 with oscillations from the sine wave sampling oscillator at a zero phase, the grid of the amplifier 119 with sine waves of 60 degree lead phase relative to the sampling oscillator, and the grid of amplifier 120 with sine waves of 60 degree lag phase relative to the sine wave sampling oscillator. It should be noted that the control grid circuit of the amplifier 118 includes a resistance divider which has no phase shift, while the control grid circuit amplifier 119 includes a capacitor-resistor divider which is so designed as to give a leading phase shift of 60 degrees, and the control grid circuit of amplifier 120 includes a resistor-capacitor divider which is so designed as to give a phase shift of minus 60 degrees. The anode circuits of all three amplifiers 118, 119, and 120, comprise parallel tuned circuits which are tuned to the sampling frequency which by way of example can be 3.8 megacycles. The inductance of each of these parallel tuned circuits constitutes the primary winding P of the transformer whose secondary S is connected to the terminal E and through the resistor-shunt condenser combination T to the terminal F of a particular varistor. The inductor in the anode tuned circuit of amplifier 118 is poled oppositely with respect to the inductors in the anode tuned circuits of amplifiers 119 and 120, thereby to insure the 120 degree phase relationship in the outputs of all three of these amplifiers.

The secondary winding S of each varistor is electrostatically shielded from its primary winding P in the anode circuit of its driving amplifier 118, 119 or 120. The reason for this is to eliminate the direct capacitance between the primary and secondary windings which if not eliminated would cause the varistor to pass a spurious signal having a frequency of the sampling frequency (in the assumed case, 3.8 megacycles). The resistor-shunt condenser combination T in series with the secondary winding S serves to build up a D. C. voltage additive with respect to the alternating current wave (3.8 megacycles) in the secondary winding S, of such magnitude and sense as to cause the varistor to become conductive for short periods of time less than the time of one-half cycle of 3.8 megacycles. This short period of time corresponds to the short positive peak value of the alternating wave component. The D. C. voltage built up across the resistor-shunt condenser combination T is produced by the flow of current through the rectifiers 1, 2, 3, and 4 of the varistor during their conduction periods. This is graphically illustrated by the curve of Fig. 3 wherein the top portions of the solid line curve above the horizontal axis indicate the conduction period for a particular varistor. The dash line peak portions of the curves above the horizontal axis indicate the conduction periods for the other two varistors of the commutator. It will thus be seen that the varistors are conductive for mutually exclusive time periods, in this case 120 degrees, or less. A shorter conduction for each varistor can be obtained by suitable choice of the parameters of the components and the resistor-shunt condenser combination T, and also the magnitude of the 3.8 megacycles control wave.

The variable capacitors G and H serve to balance 3.8 megacycle voltage on the two terminals E and F of the varistor with respect to ground, thereby further preventing the passage of 3.8 megacycle alternating components by the varistor in the absence of video modulation applied to terminal A. These capacitors compensate for an unbalance due to stray capacity of the secondary winding S to ground.

It should be noted that there is provided a resistor network between the positive anode supply B+ and ground, and that the terminal B of the varistor is connected to a point intermediate the ends of this network. The values of this network are so chosen that the D. C. potential at terminal B is the same as the D. C. potential at terminal A in the absence of video modulation. Stated otherwise, at black level corresponding to an arbitrary or predetermined D. C. level, there will be no output from the varistor.

In practice, it was found to be important to shield the terminals E and F of the varistor from the terminals A and B of the varistor in order to reduce to an absolute minimum any possible tendency for spurious oscillations of 3.8 megacycles being passed by the varistor in the absence of video input modulation. This was done by inserting a ground shield between these terminals in the manner shown in more detail in Fig. 2.

The output of each varistor, taken from terminal B is a pulse whose amplitude depends upon the instantaneous value of the video modulation during the conduction period of the varistor. This output is applied to a vacuum tube buffer amplifier 122. The output electrodes of the three buffer amplifiers 122 from all three varistors are directly connected together as a result of which there is a composite signal output in the common lead L which extends through suitable apparatus to the very high frequency transmitter for modulating the amplitude of the carrier wave produced by the transmitter. It is this carrier wave which together with suitable synchronizing pulses used in television systems is radiated for reception by the distant television receiver.

In the operation of each varistor, the impedance between the pair of diagonally opposite terminals A and B is low during the portion of the sampling signal cycle when the rectifiers 1, 2, 3, and 4 are conducting current, and this impedance is high when these rectifiers are not conducting current. As mentioned before in connection with Fig. 3, these rectifiers will be conducting current for only a short interval of time corresponding to the positive peak of the sampling cycle, and this positive peak will be appreciably shorter than the interval of one-half cycle. During the time the rectifiers of any one varistor are conducting current, any video modulation from its associated color channel appearing at terminal A will be passed by the varistor and will appear at terminal B. At all other times when the rectifiers of the varistor are not passing current, any video modulation appearing at terminal A will be so highly attenuated by the varistor that it will have a negligible value at terminal B. It will thus be seen that the varistor serves to pass amplitude modulated video signals appearing at terminal A through it to terminal B at selected time intervals. Since all these varistors of the commutator are conductive at mutually exclusive time intervals, there will appear in the output of the commutator sampling pulses at a 3.8 megacycle rate. These sampling pulses, as mentioned above, are mixed or combined in the outputs of the buffer amplifiers to provide a composite signal which appears in the common output lead L.

It should be understood that the sampling frequency of 3.8 megacycles for the sine wave sampling oscillator has been chosen by way of example only, since in practice this sampling frequency may cover a wide range of frequencies, for example, a range of 2.8–4 megacycles.

The phase shifting circuit comprising the amplifiers 118, 119 and 120 for splitting the oscillations from the sine wave sampling oscillator input IN into three phase displaced waves constitutes only one of several different ways of abstracting three displaced waves from a common alternating current source. Other phase splitting or phase shifting circuits known in the art can be used instead, such as circuits having inductance, resistance and condenser-resistance combinations, and also delay line circuits.

In one embodiment of a color television system successfully tried out in practice and using the commutator of the invention, the sine wave sampling oscillator input constituted the output of a stabilized sine wave oscillator which was keyed at horizontal line frequencies at the transmitter. Stated otherwise, this stabilized oscillator was started on the beginning of every horizontal scanning line and stopped at the end of every horizontal scanning line. This was done in response to suitable horizontal synchronizing pulses which were also injected into the common output circuit for controlling a similar stabilized sine wave oscillator at the commutator of the receiver. At the receiver, an electronic commutator of the invention similar to that at the transmitter, was used to sample the demodulated video wave appearing in a common input circuit extending from the video output of a conventional television receiver, and to supply these time displaced samples at 120 degree time intervals to the different color channels. Thus the color channels at the receiver were sequentially supplied with pulse samples of the demodulated wave, each pulse sample representative of a particular color being supplied to a particular channel for reproducing that color information.

What I claim is:

1. An electronic commutator comprising a bridge circuit including rectifiers in the four arms thereof and all connected to permit current to flow therethrough in the same direction when suitably excited, input and output circuits coupled to one pair of diagonally opposite terminals of the bridge, and a series circuit of an inductor and a resistor-shunt capacitor network connected to the other pair of diagonally opposite terminals; means for applying a recurring waveform to said inductor, an electrostatic shield between said means and said inductor, the values of the components of said resistor-shunt capacitor network being such as to lessen the time duration of minimum attenuation of the bridge to the passage of signals from said input circuit to said output circuit to an interval less than one-half cycle of said recurring waveform.

2. An electronic commutator comprising a bridge circuit including rectifiers in the four arms thereof and all connected to permit current to flow therethrough in the same direction when suitably excited, input and output circuits coupled to one pair of diagonally opposite terminals of the bridge, and a series circuit of an inductor and a resistor-shunt capacitor network connected to the other pair of diagonally opposite terminals; means for applying a recurring waveform to said inductor, an electrostatic shield between said means and said inductor, the values of the components of said resistor-shunt capacitor network being such as to lessen the time duration of minimum attenuation of the bridge to the passage of signals from said input circuit to said output circuit to an interval less than one-half cycle of said recurring waveform, additional bridge circuits similar in construction and arrangement to said first bridge circuit and having separate input and output circuits, means for combining the outputs from all of said bridge circuits and means for supplying said recurring waveform to the inductors of all of said bridge circuits at mutually exclusive time intervals, whereby said bridge circuits are sequentially operative to pass signals from their respective input circuits to the combined output circuit.

3. An electronic commutator comprising a bridge circuit including rectifiers in the four arms thereof and all connected to permit current to flow therethrough in the same direction when suitably excited, input and output circuits coupled to one pair of diagonally opposite terminals of the bridge, and a series circuit of an inductor and a resistor-shunt capacitor network connected to the other pair of diagonally opposite terminals, a pair of balancing capacitors connected between a point of reference potential and said last pair of terminals; means for applying a recurring waveform to said inductor, an electrostatic shield between said means and said inductor, the values of the components of said resistor-shunt capacitor network being such as to lessen the time duration of minimum attenuation of the bridge to the passage of signals from said input circuit to said output circuit to an interval less than one-half cycle of said recurring waveform.

4. An electronic commutator comprising a bridge circuit including rectifiers in the four arms thereof and all connected to permit current to flow therethrough in the same direction when suitably excited, input and output circuits coupled to one pair of diagonally opposite terminals of the bridge, and a series circuit of an inductor and a resistor-shunt capacitor network connected to the other pair of diagonally opposite terminals, a pair of variable balancing capacitors connected between ground and said last pair of terminals, an electrostatic shield between said series circuit and all four arms of said bridge circuit; means for applying a recurring waveform to said inductor, an electrostatic shield between said means and said inductor, the values of the components of said resistor-shunt capacitor network being such as to lessen the time duration of minimum attenuation of the bridge to the passage of signals from said input circuit to said output circuit to an interval less than one-half cycle of said recurring waveform.

5. In combination, a bridge circuit comprising four arms in each of which is a rectifier, a signal input circuit and a signal output circuit respectively coupled each to one of a pair of diagonally opposite terminals of said bridge circuit, a series circuit of an inductor and a resistor-shunt capacitor network connected between the other two diagonally opposite terminals of said bridge circuit, said rectifiers being so poled as to permit current simultaneously to flow therethrough in the same direction between said terminals, balancing capacitors connected between a point of reference potential and said last terminals, means for supplying said inductor with a periodically recurring waveform, said means including the primary winding of a transformer whose secondary winding is said inductor, and an electrostatic shield between said primary and secondary windings.

6. In combination, a bridge circuit comprising four arms in each of which is a rectifier, a signal input circuit and a signal output circuit respectively coupled each to one of a pair of diagonally opposite terminals of said bridge circuit, a series circuit of an inductor and a resistor-shunt capacitor network connected between the other two diagonally opposite terminals of said bridge circuit, said rectifiers being so poled as to permit current simultaneously to flow therethrough in the same direction between said terminals, balancing capacitors connected between a point of reference potential and said last terminals, means for periodically reducing the attenuation of said bridge circuit to the passage of signals between said input and output circuits comprising a coil adapted to be excited by a periodically repeating waveform and magnetically coupled to but electrostatically shielded from said inductor, said resistor-shunt capacitor network having such value as to reduce the time interval of minimum attenuation of said bridge circuit to the passage of signals therethrough below the time interval of one-half cycle of periodically recurring waveform.

7. A combination as defined in claim 6, including means for electrostatically shielding said series circuit from all four rectifiers in said bridge circuit and from the signal input and output terminals of said bridge circuit.

8. In combination, a bridge circuit comprising four arms in each of which is a rectifier, a signal input circuit and a signal output circuit respectively coupled each to one of a pair of diagonally opposite terminals of said bridge, a series circuit of an inductor and a resistor-shunt capacitor network connected between the other two diagonally opposite terminals of said bridge circuit, said rectifiers being so poled as to permit current simultaneously to flow therethrough in the same direction between said terminals, balancing capacitors connected between a point of reference potential and said last terminals, means for supplying said inductor with a periodically recurring waveform, said means including the primary winding of a transformer whose secondary winding is said inductor, an electrostatic shield between said primary and secondary windings, means for supplying a predetermined direct current voltage to said signal input circuit of a value corresponding to a level of modulation not to be passed by said bridge circuit, and means for supplying to said output circuit a potential to compensate for said direct current voltage.

9. In combination, a bridge circuit comprising four arms in each of which is a non-linear resistance element, a signal input circuit and a signal output circuit respectively coupled each to one of a pair of diagonally opposite terminals of said bridge circuit, a series circuit of an inductor and a resistor-shunt capacitor network connected between the other two diagonally opposite terminals of said brige circuit, balancing capacitors connected between a point of reference potential and said last terminals, means for supplying said inductor with a periodically recurring waveform, said means including the primary winding of a transformer whose secondary winding is said inductor.

10. In combination, a bridge circuit comprising four arms in each of which is a non-linear resistance element, a signal input circuit and a signal output circuit respectively coupled each to one of a pair of diagonally opposite terminals of said bridge circuit, a series circuit of an inductor and a resistor-shunt capacitor network connected between the other two diagonally opposite terminals of said bridge circuit, balancing capacitors connected between a point of reference potential and said last terminals, another inductor magnetically coupled to said first inductor, and an electrostatic shield between said two inductors.

EDWIN A. GOLDBERG.

REFERENCES CITED

The following references are of record in the file of this patent:

UNITED STATES PATENTS

| Number | Name | Date |
|---|---|---|
| 2,293,628 | Reiling | Aug. 18, 1942 |
| 2,333,969 | Alexanderson | Nov. 9, 1943 |